United States Patent
Lin et al.

(10) Patent No.: US 7,226,534 B2
(45) Date of Patent: Jun. 5, 2007

(54) ELECTRIC JAR POT WITH OZONE DISINFECTION FUNCTION

(76) Inventors: Yu-Yueh Lin, 3F, No. 17, Jiang-Nan St., Neihu District, Taipei (TW); Kun-Jung Yang, No. 40, Lane 113, Hangjou Rd., Jungli City, Taoyuan (TW); Hai-Yau Ho, 2F, No. 14, Lane 2, Tai-Shun St., Da-Am District, Taipei (TW)

(*) Notice: Subject to any disclaimer, the term of this patent is extended or adjusted under 35 U.S.C. 154(b) by 154 days.

(21) Appl. No.: 10/901,979

(22) Filed: Jul. 30, 2004

(65) Prior Publication Data
US 2006/0021923 A1 Feb. 2, 2006

(51) Int. Cl.
*C02F 1/02* (2006.01)
*C02F 1/78* (2006.01)

(52) U.S. Cl. .................. 210/177; 210/192; 210/244; 210/464

(58) Field of Classification Search ......... 210/177, 210/192, 244, 464; 261/122.1, 142, DIG. 42; 422/186.12; 392/444
See application file for complete search history.

(56) References Cited

U.S. PATENT DOCUMENTS 5,900,143 A * 5/1999 Dalton et al. .............. 210/192

FOREIGN PATENT DOCUMENTS

JP 02257860 A * 10/1990

OTHER PUBLICATIONS

English language translation of Japanese Patent 02-257860.*

* cited by examiner

*Primary Examiner*—Matthew O. Savage
(74) *Attorney, Agent, or Firm*—Lowe Hauptman & Berner, LLP

(57) ABSTRACT

The present invention discloses an electric jar pot with ozone disinfection function. The device includes a jar pot with an ozone generator and an ozone conveying device. By the power source connected with the device, the ozone generator produce the ozone gas while the device boils water. Through the ozone conveying device, the ozone gas is delivered to the bottom of the jar pot and is released, dissolved in water to form ozone water. Thus the germs inside the water are eliminated, the water is sterilized and purified.

2 Claims, 8 Drawing Sheets

ELECTRIC JAR POT WITH OZONE DISINFECTION FUNCTION

BACKGROUND OF THE INVENTION

The present invention relates to an electric jar pot, more specially to an electric jar pot with an ozone generator that produce ozone from the bottom of the jar pot and the ozone gas is dissolved in the water for oxidizing the contaminants or bacteria and provide clean and healthy water.

Water is essential to our daily lives. However, it's difficult to control the quality of water because the pollution of water resource is getting serious. No matter in hotels or at home, it's impossible to drink directly from the tap. Thus it is necessary to use electric jar pots for water boiling.

SUMMARY OF THE INVENTION

The present invention is to provide an electric jar pot with ozone disinfection function that is composed by an electric jar pot and a ozone generator, connected with each other by an ozone conveying device. By the power source from the electric jar pot, the ozone generator produces ozone gas. Then the gas is conveyed through the ozone conveying device to the bottom of the jar pot and is released to the water therein. The ozone water is formed to oxidize the microorganism and purify the water.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
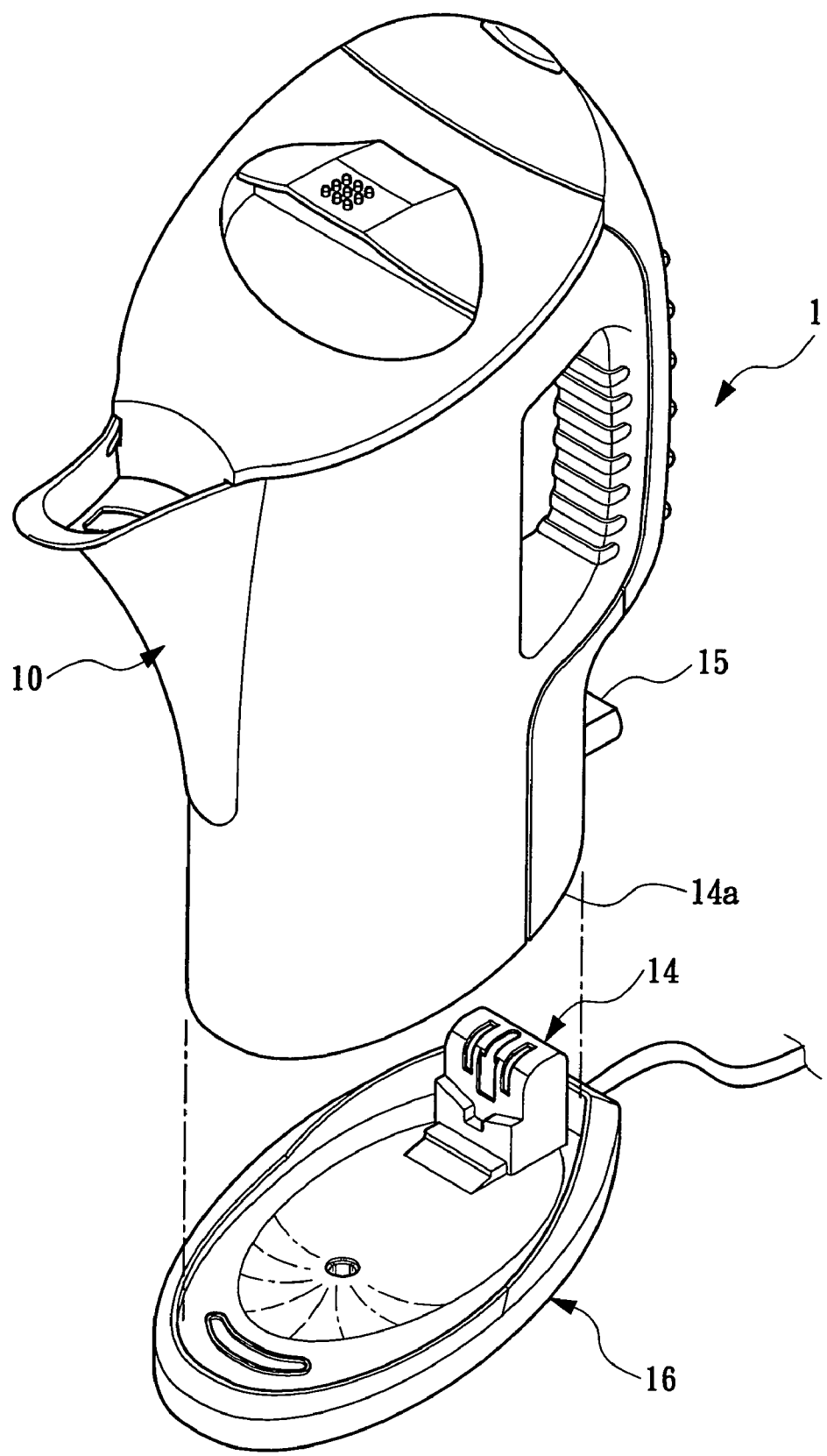
FIG. 1 is a perspective view of an electric jar pot in accordance with a prior art.
Figure 2:
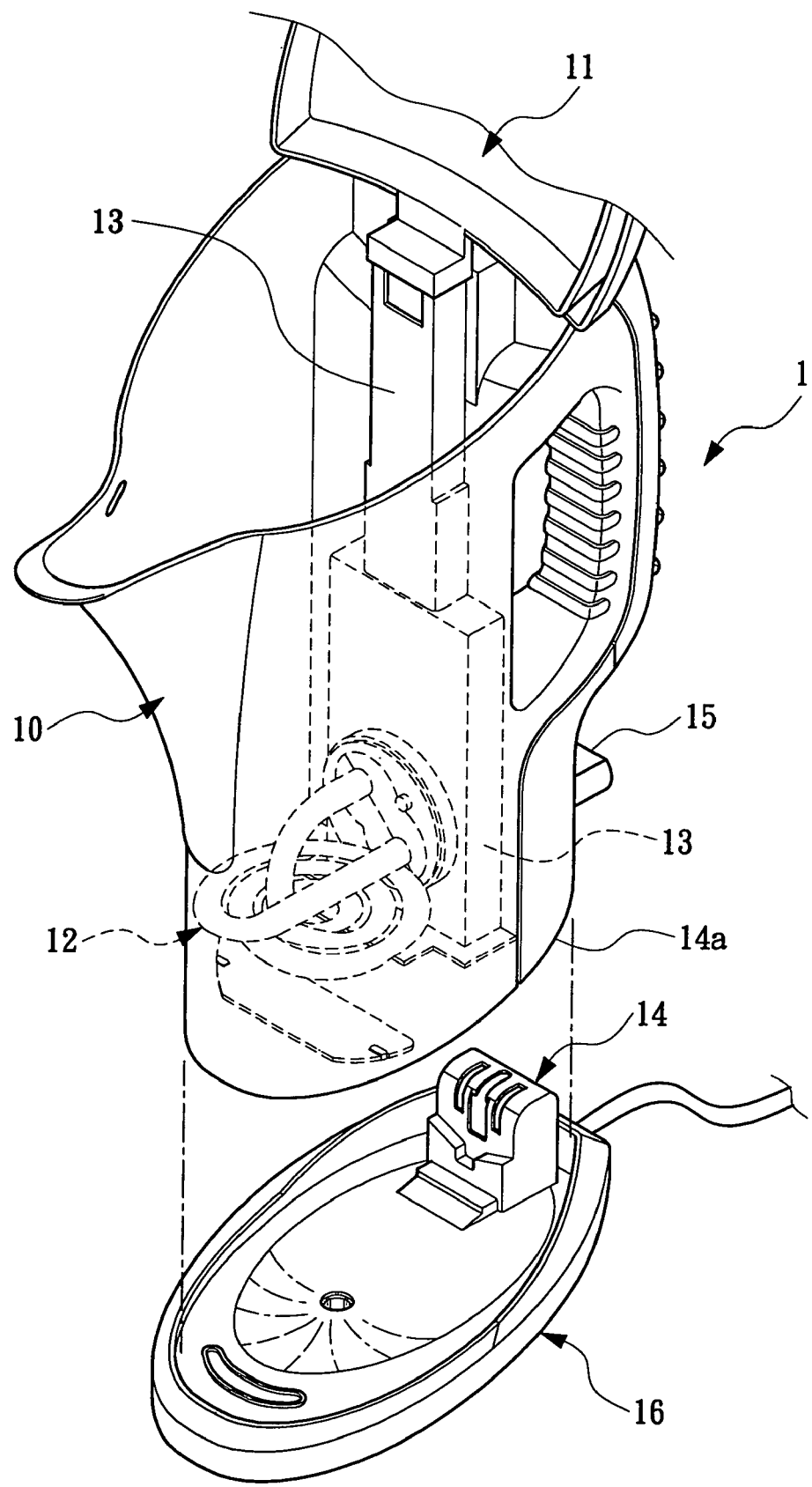
FIG. 2 is a transparent view of a prior art shown in FIG. 1.
Figure 3:
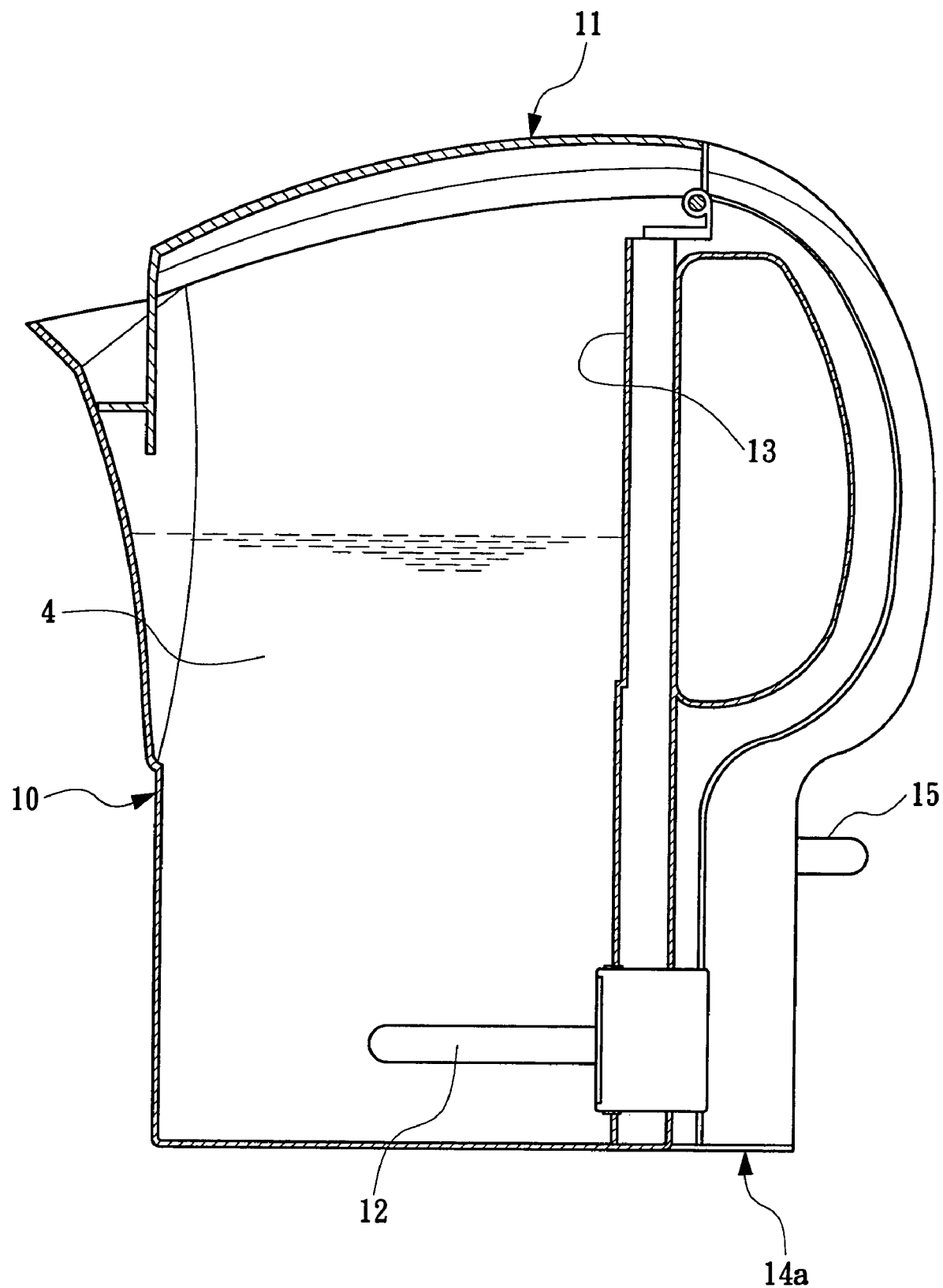
FIG. 3 is a cross-sectional view of a prior art shown in FIG. 1.

Refer to FIG. 1, FIG. 2 & FIG. 3, a general electric jar pot 1 is composed by a body 10, a cover 11, a heater 12 arranged inside the bottom of the body 10, an isolation cell 13 for accommodating electronic devices (not shown in figures), a power supply 14 and a control switch 15. When being used, the cover 11 is open for filling water into the body 10. By the connection between the power supply 14 and a power source, the control switch 15 is pressed so as to make the heater 12 work for boiling the water. The electronic devices, the power supply 14 and the control switch 15 are all isolated from the water inside the body 10. They can be designed with different styles and structures. For examples, the heater 12 can be connected with an outer power source by a wire directly. Or the power supply 14 is installed on a base 16 of another outer power source, as shown in FIG. 1, 2, 3, while a socket 14a corresponding to the power supply 14 is mounted on the body 10. When the body 10 is disposed on the base 16, the socket 14a is connected with the power supply 14 to form electrical conduction. Moreover, a safety device can be integrated in the control switch 15 so as to make the control switch 15 shut off automatically while water boils or the device overheats. Thus the safety of the device is enhanced.

Refer to FIG. 4, FIG. 5, FIG. 6, FIG. 7, & FIG. 7A, the present invention is characterized in that an ozone generator 2, together with an ozone conveying device 3, are disposed on the body 10 of the electric jar pot 1. By the existing power source of the jar pot 1, the ozone generator produces ozone gas that is transported to the bottom of the body 10 by the ozone conveying device 3 and then is released and resolved to the water 4 inside the body. The water 4 is purified and the microorganism is eliminated.

Figure 7:
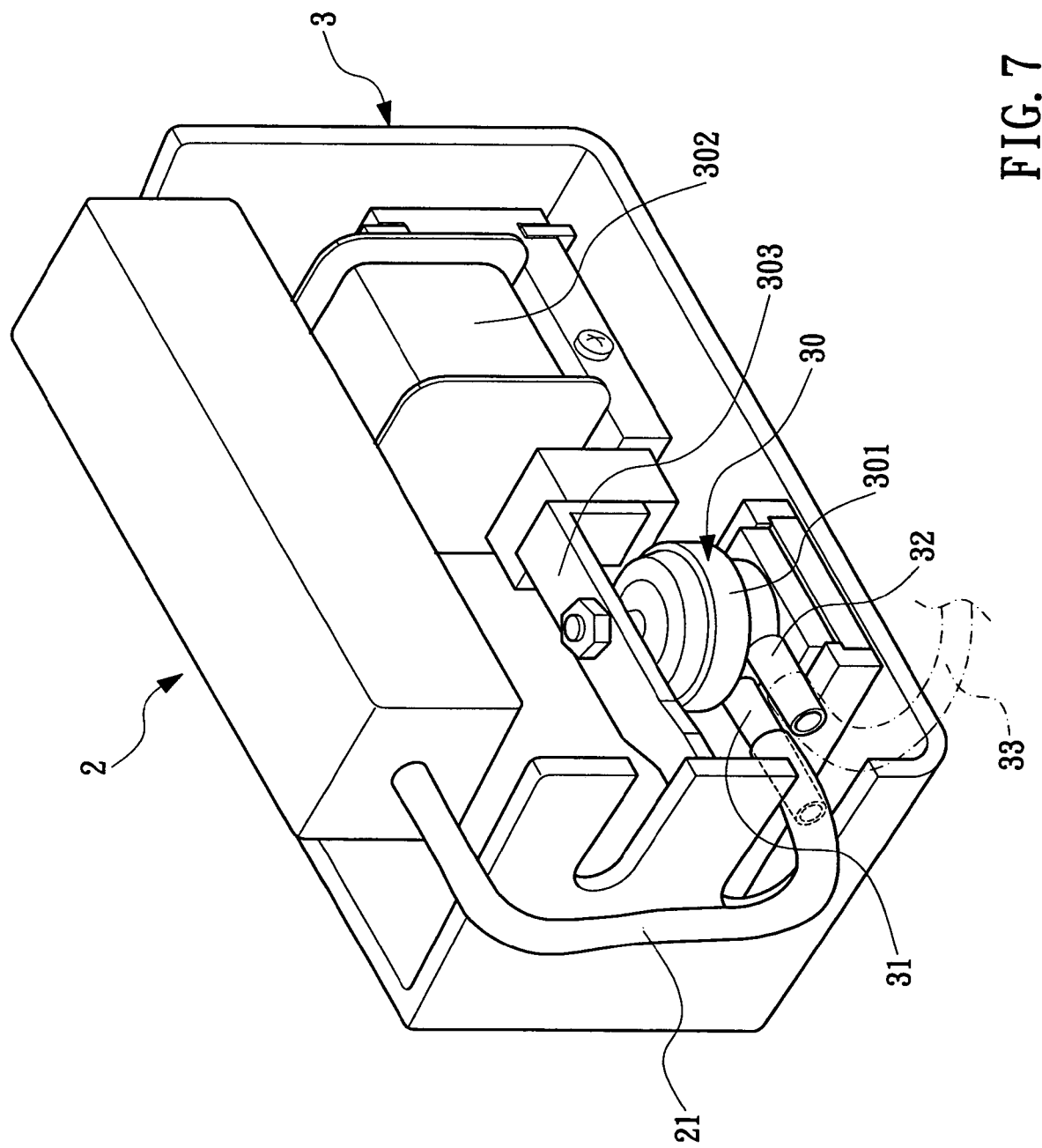
FIG. 7 is a perspective view of an ozone generator and an ozone conveying device in accordance with the present invention.
Figure 7A:
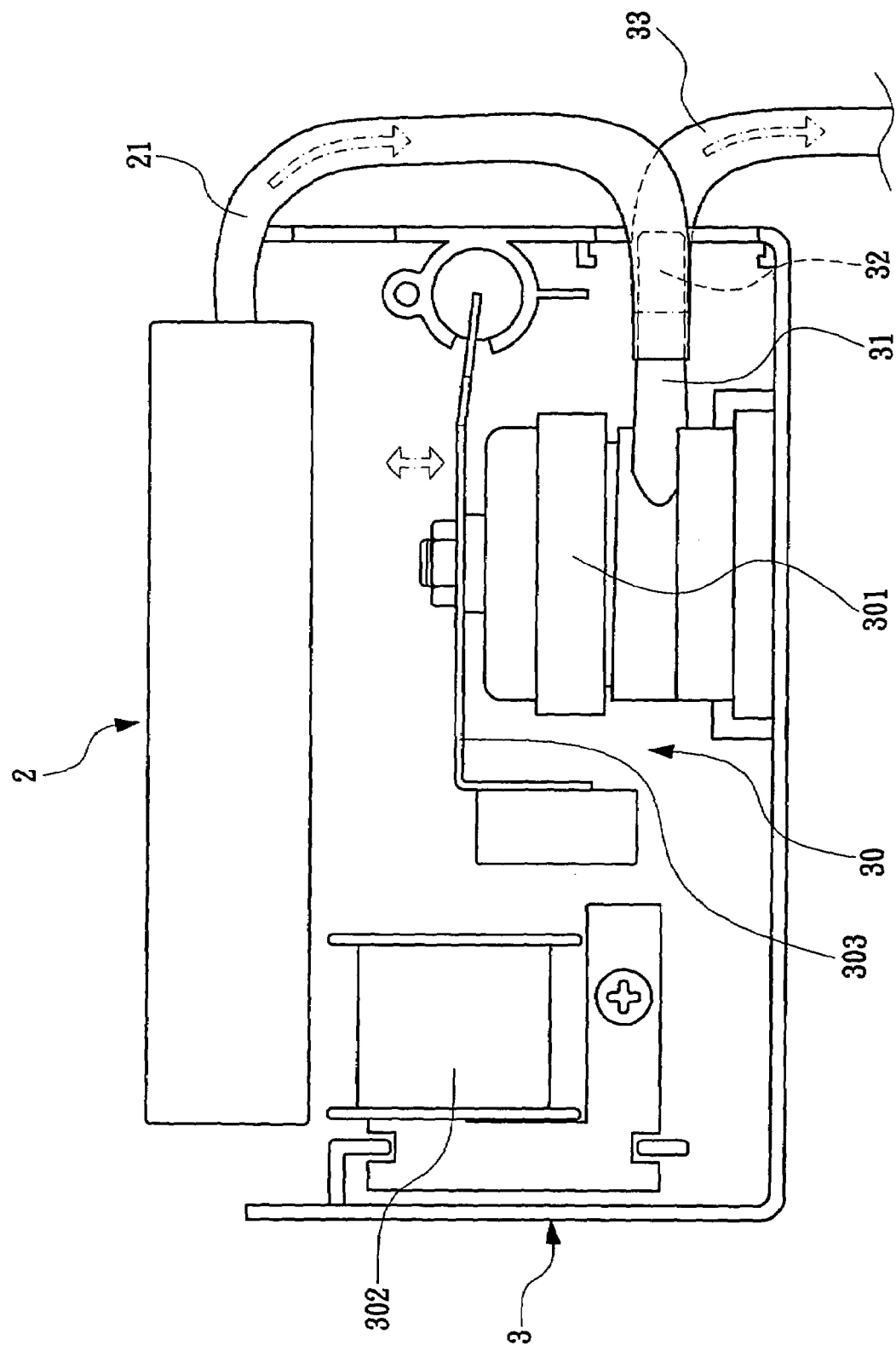
FIG. 7A is a schematic drawing of a side view of an embodiment of the present invention shown in FIG. 7.

The ozone generator 2 is defined by devices that produce ozone by UV light or a corona discharge while the later is a better way. At least one venting hole 21 is arranged on the ozone generator 2 for discharging ozone, as shown in FIG. 7 & FIG. 7A.

The ozone conveying device 3 is design for delivering the ozone gas produced by the ozone generator 2 to the bottom of the water 4 inside the body 10 so that the ozone is dissolved in the water 4. Refer to FIG. 7 & FIG. 7A, the ozone conveying device 3 includes a pump 30, a one-way gas intake hole 31, a one-way gas venting hole 32 and an ozone delivering pipe 33 connected to the bottom of the body 10. The principle of the pump 30 can be various. FIG. 7 & FIG. 7A show only an embodiment in which the pump 30 is formed by a quick-moving blower 301. By the switch of the poles of the electromagnet 302, a cantilever 303 is driven and is oscillated quickly. The blower 301 is connected to an open end of the cantilever 303 so that it also moves according to the oscillation of the cantilever 303. The gas intake hole 31 is connected to the venting hole 21 of the ozone generator 2 so that the ozone gas passes through the venting hole 21, enters the gas intake hole 31 and then arrives the pump 30 that produces enough pressure to deliver the ozone gas through the gas venting hole 32, into the ozone delivering pipe 33 in one-way direction. The ozone delivering pipe 33 conveys the ozone gas to the bottom of the water 4 inside the body 10. The ozone gas is released through the end opening 34 and is dissolved in the water 4 to form ozone water. The concentration of the ozone inside the water can reach 25%. The ozone can disinfects water and destroy germs therein thus the water treated with ozone is better than general drinking water.

Figure 4:
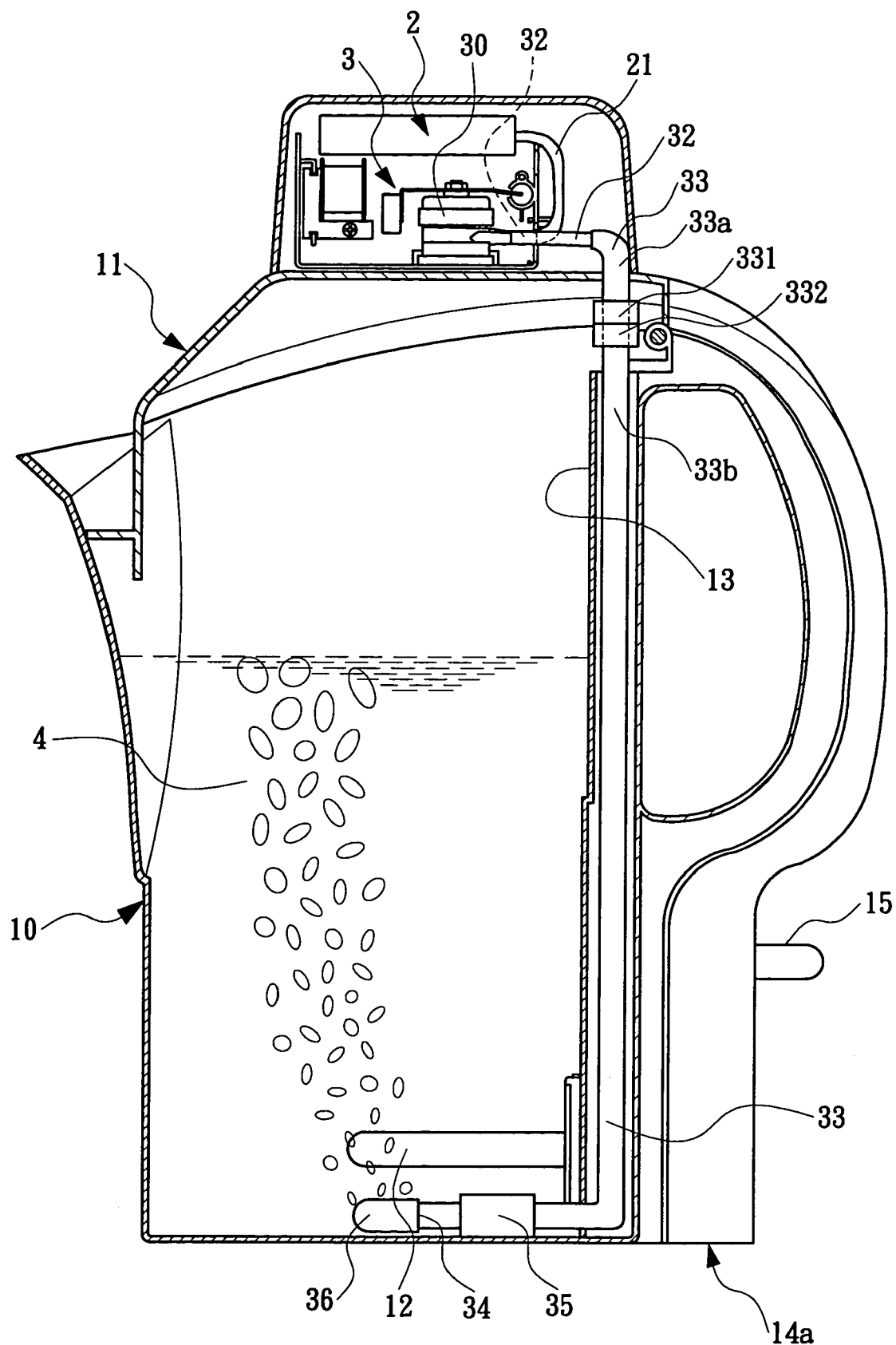
FIG. 4 is a cross-sectional view of an embodiment in accordance with the present invention.
Figure 5:
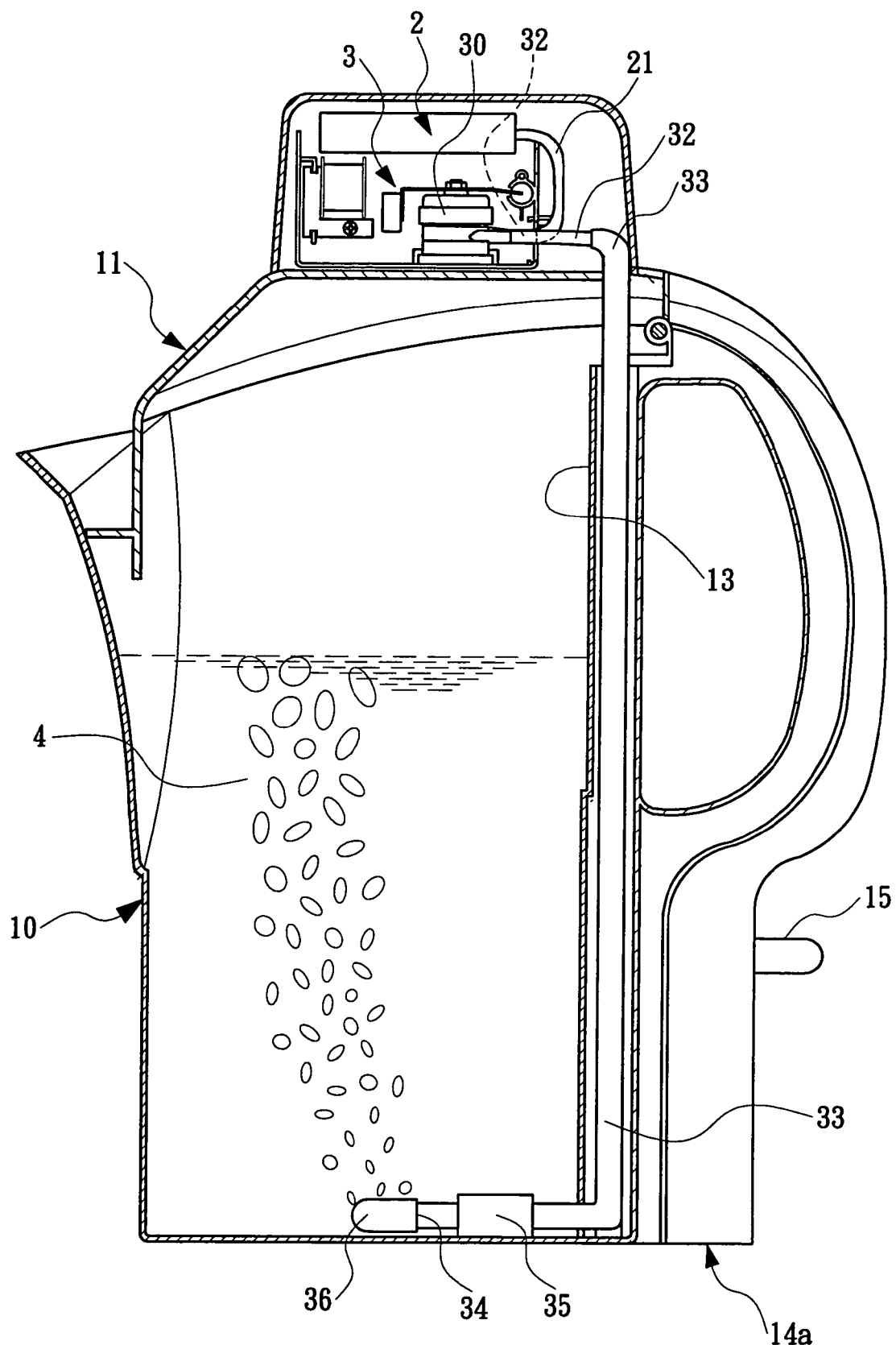
FIG. 5 is a cross-sectional view of another embodiment in accordance with the present invention.
Figure 6:
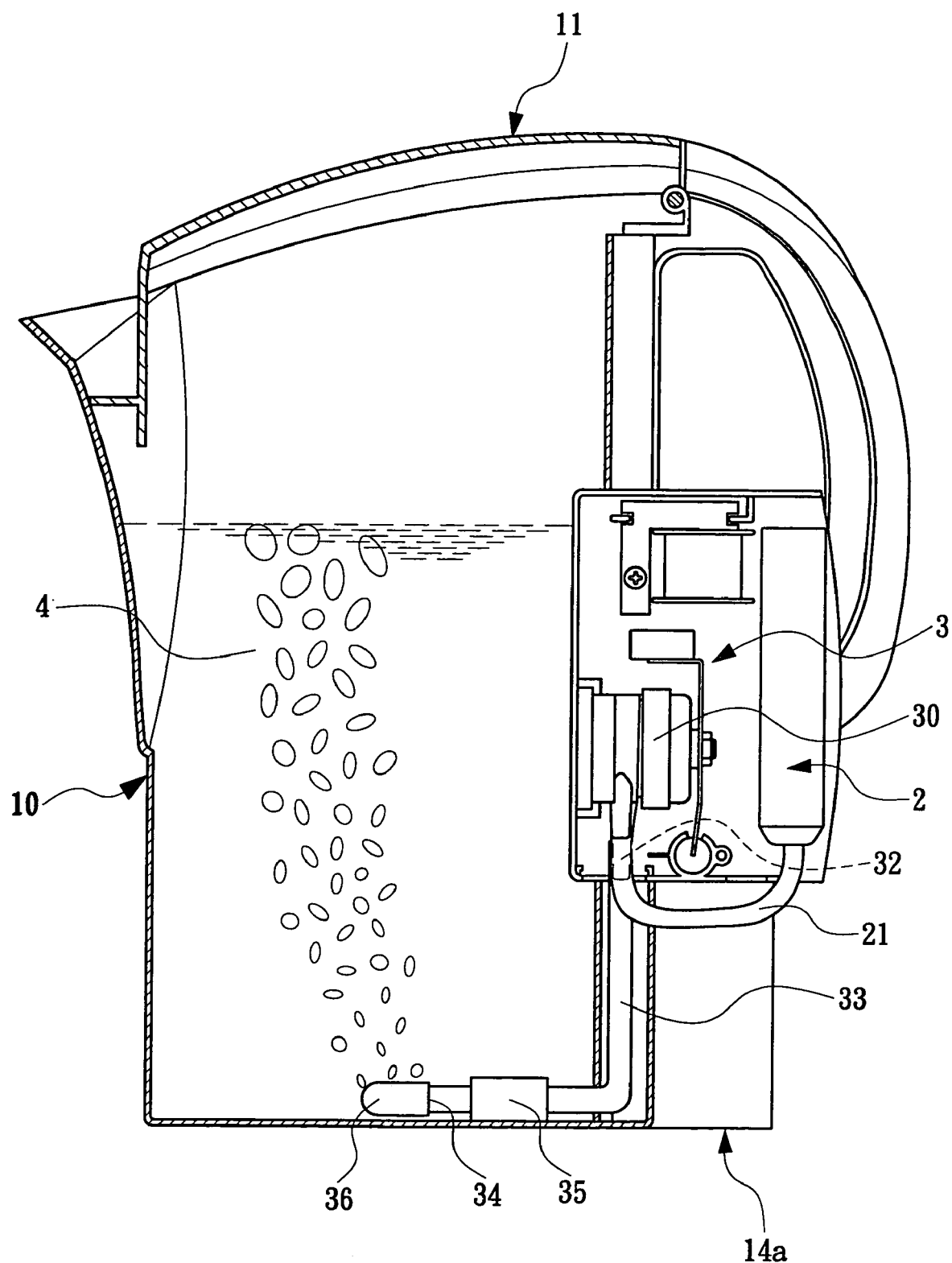
FIG. 6 is a cross-sectional view of a further embodiment in accordance with the present invention.

The design of the ozone generator 2 and the ozone conveying device 3 can be modified according to the structure of the jar port 1 or the body 10. For example, the ozone generator 2 and the ozone conveying device 3 can be integrated to form one part or be produced separately into a module for being assembled easily on the body 10. As shown in FIG. 4, FIG. 5, and FIG. 6, the ozone generator 2 and the ozone conveying device 3 are combined into one part.

Furthermore, the positions on which the body 10 is arranged with the ozone generator 2 and the ozone conveying device 3 can be changed. Refer to FIG. 4 & FIG. 5, the ozone generator 2 and the ozone conveying device 3 are integrated on the upper part of the body 10 such as on the cover 11, or on the middle part of the body 10, as shown in FIG. 6, or on the bottom thereof. The body 10 and the cover are made by plastic injection molding and their shapes can be changed according to the position for disposing the ozone generator 2 and the ozone conveying device 3. The shape or the position of the isolation cell 13 can also be modified for assembling of the ozone generator 2 and the ozone conveying device 3.

The design of the ozone delivering pipe 33 can be modified according to the integrated part of the ozone generator 2 and the ozone conveying device 3. Refer to FIG. 4, when the integrated part of the ozone generator 2 and the ozone conveying device 3 is arranged inside the cover 11 of the body 10, the ozone delivering pipe 33 having an upper part 33*a* and a lower part 33*b*. The upper part 33*a* is connected with the gas venting hole 32 with the lower open end downwards. An upper plastic ring for sealing 331 is installed on the lower open end of the upper part 33*a*. While the lower part 33*b* extends downwards to the bottom of the body 10 (along the isolation cell 13) with an upper open end corresponding to the lower open of the upper part 33*a* and a lower plastic ring for sealing 332. When the cover 11 is set on the top of the body 10, the upper plastic ring for sealing 331 of the upper part 33*a* connected to the lower plastic ring for sealing 332 of the lower part 33*b* firmly so that the upper part 33*a* also joins with the lower part 33*b* closely. The ozone gas is conveying to the bottom of the body 10 through the upper part 33*a* and the lower part 33*b* of the ozone delivering pipe 33 for being releasing from the bottom of the water 4.

Refer to FIG. 4, FIG. 5 & FIG. 6*m*, the ozone delivering pipe 33 extends into the bottom of the body so that the ozone gas is released from the bottom of the water 4. A check valve is set on the upper end of the ozone delivering pipe 33 for preventing reverse flow of water. Moreover, an air stone 36 is disposed on the end opening 34 of the ozone delivering pipe 33 so as to produce bubbles of ozone gas and increase the contact area between the ozone gas and the water. Thus the solubility of ozone into water is increased.

The ozone generator 2 and the ozone conveying device 3 can also use the same power source connected to the power supply of the jar pot 1. The control switch 15 is multi-stage—the first stage is for heater 12, the second stage is for the ozone generator 2 and the ozone conveying device 3, while the third stage is for simultaneous working of the heater 12, the ozone generator 2 and the ozone conveying device 3. Users can choices different models—with or without production of ozone during the boiling of water inside the Jar pot 1, or only purifying drinking water in room temperature without boiling water, according to their needs.

While a preferred embodiment of the invention has been shown and described in detail, it will be readily understood and appreciated that numerous omissions, changes and additions may be made without departing from the spirit and scope of the invention.

What is claimed is:

1. An electric jar pot with ozone disinfection function comprising:

a body, a cover, a heater on a bottom of the body, a power supply and a control switch; the cover is open for filling water into the body, the heater works when the power supply is connected to a power source and the control switch is pressed; the electric jar pot is characterized in that:

an ozone generator and an ozone conveying device are arranged on the electric jar pot; by the connection between the power supply and the power source, the ozone generator produces ozone gas that is delivered by the ozone conveying device to the bottom of the body; then the ozone gas is released from the bottom of the body and is dissolved in the water for purification and disinfection; and wherein the ozone generator and the ozone conveying device are disposed on the cover.

2. An electric jar pot with ozone disinfection function comprising:

a body, a cover, a heater on a bottom of the body, a power supply and a control switch; the cover is open for filling water into the body, the heater works when the power supply is connected to a power source and the control switch is pressed; the electric jar pot is characterized in that:

an ozone generator and an ozone conveying device are arranged on the electric jar pot; by the connection between the power supply and the power source, the ozone generator produces ozone gas that is delivered by the ozone conveying device to the bottom of the body; then the ozone gas is released from the bottom of the body and is dissolved in the water for purification and disinfection; the ozone generator and ozone conveying device are integrated into one component; and wherein said one component including the ozone generator and the ozone conveying device is disposed on the cover.

* * * * *